Feb. 7, 1939.     R. E. SAMUELSON     2,145,895
CONTROL CIRCUIT FOR SHAFT POSITIONING SYSTEM
Filed Dec. 24, 1937     2 Sheets-Sheet 2
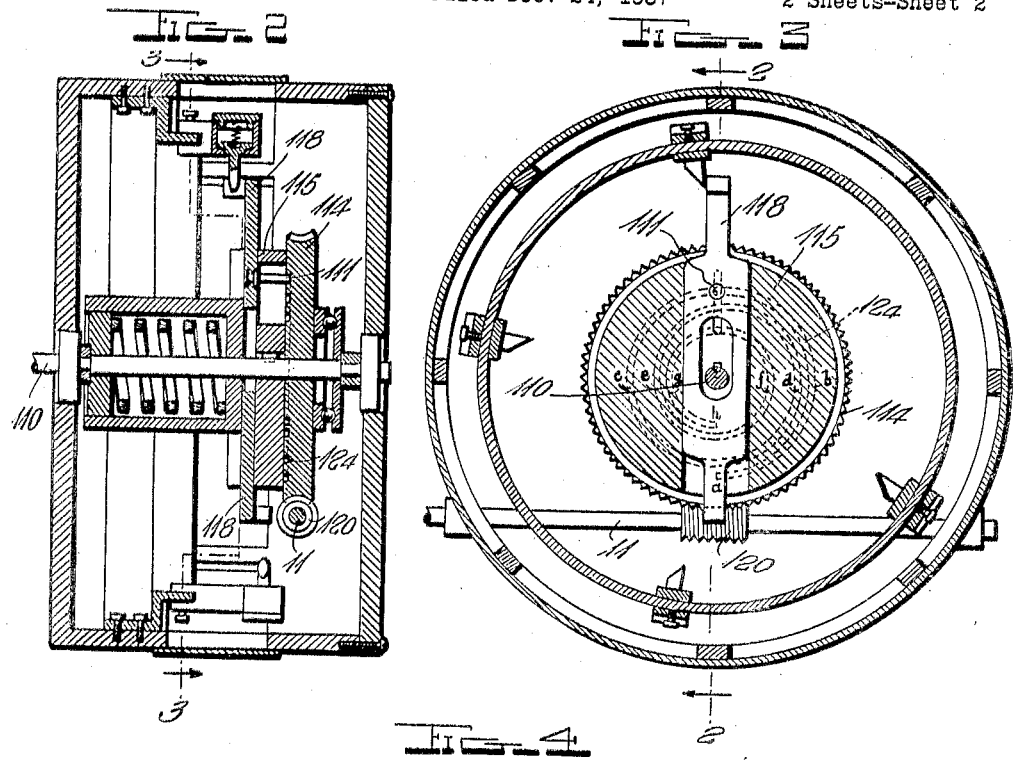
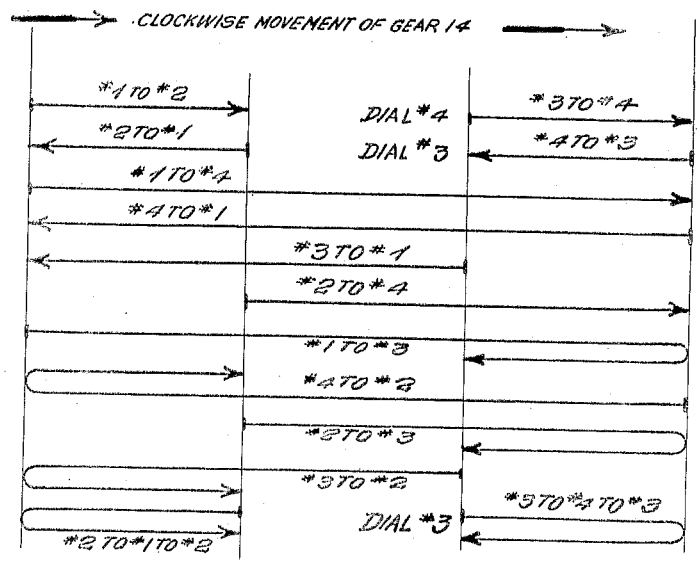
INVENTOR.
Robert E. Samuelson,
BY
John C. Grady
ATTORNEY.

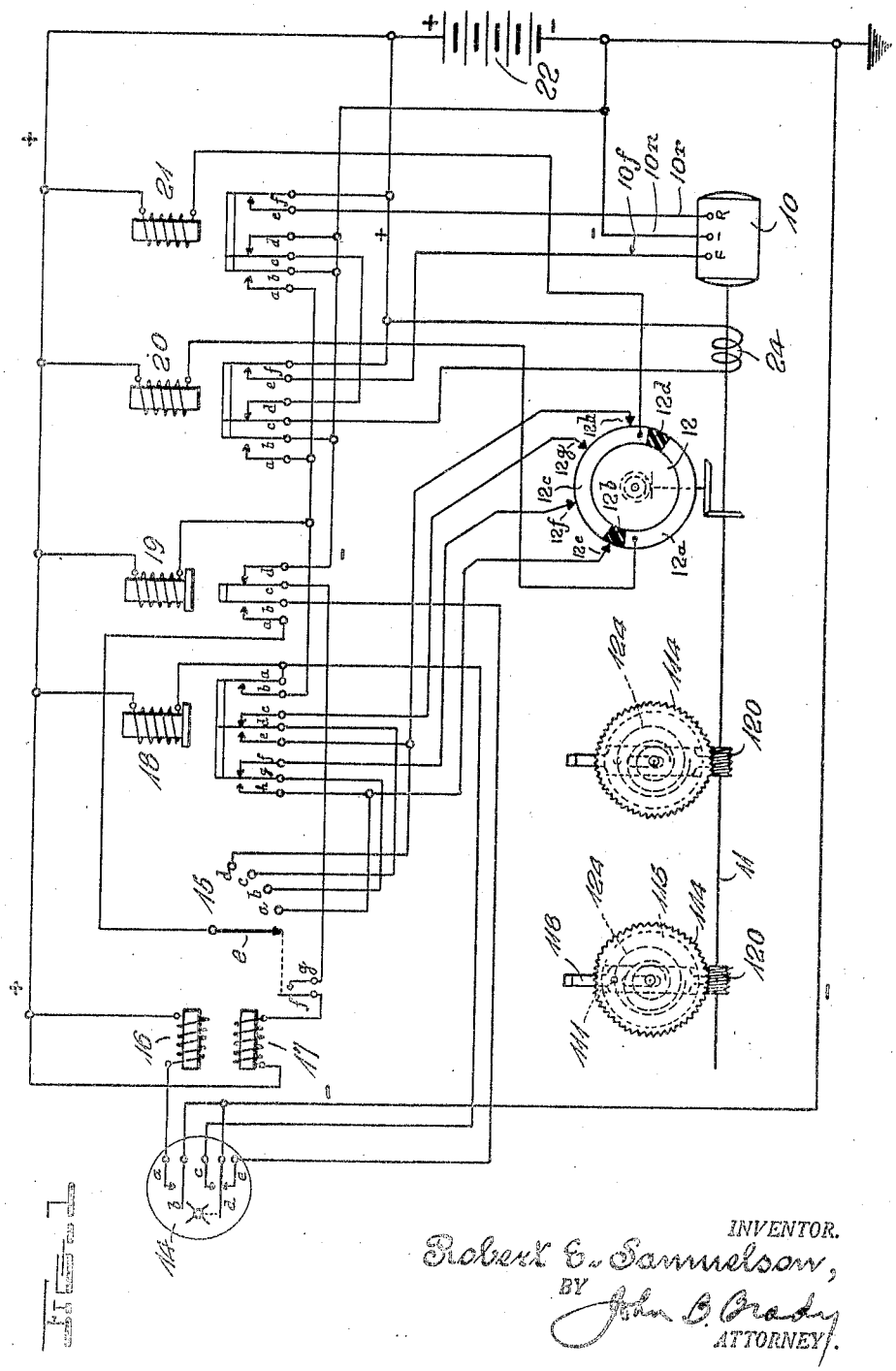

Patented Feb. 7, 1939

2,145,895

UNITED STATES PATENT OFFICE

2,145,895

CONTROL CIRCUIT FOR SHAFT POSITIONING SYSTEM

Robert E. Samuelson, Cedar Rapids, Iowa, assignor to Arthur A. Collins, Cedar Rapids, Iowa Application December 24, 1937, Serial No. 181,707

8 Claims. (Cl. 172—239)

My invention relates broadly to automatic shaft positioning systems and more particularly to a control circuit for shaft positioning devices of a type adapted to establish a shaft in position in accordance with the direction and degree of rotation of a controlling element.

A shaft positioning device of the type controllable by the circuit of my invention is shown in certain figures in the accompanying drawings, and forms the subject matter of a copending application filed by Arthur A. Collins, Serial No. 180,658 filed December 18, 1937, for Shaft positioning device. However, the circuit of my invention is adaptable to any device wherein a desired setting may be established within predetermined limits of angular movement in a single direction or successive phases of predetermined angular movement in opposite directions.

One of the objects of my invention is to provide a control circuit for a shaft positioning system employing a single reversible driving motor for rotating the shaft.

Another object of my invention is to provide a control circuit for a shaft positioning system adapted to establish a shaft in a selected one of a plurality of predetermined positions in accordance with a series of electrical impulses such as are produced by operation of a dial switch.

A further object of my invention is to provide a control circuit comprising an impulse actuating switch and control relays including relays having different time constants for energizing a reversible motor in accordance with the set and desired positions of a controlled shaft driven by the motor.

Still another object of my invention is to provide a control circuit normally deenergized but operative upon the actuation of a dial type impulse switch in a predetermined series of operations with respect to the energizing circuits of a reversible motor in accordance with the number of impulses derived from the dial type switch.

A still further object of my invention is to provide a drum type control switch driven by a reversible motor and having a plurality of contacts connected in a control system and adjustable in accordance with predetermined degrees of rotation required of the motor.

Still another object of my invention is to provide a control circuit employing a selector switch and a pair of differently timed slow release relays for controlling a sequence of operations in combination with forward and reverse motor control relays operative in connection with a drum type switch driven by the motor shaft, the control circuit functioning to determine automatically the degree and direction of angular rotation of the motor shaft.

Other and further objects of my invention reside in the elements and the circuit connections disclosed as hereinafter more fully set forth with reference to the accompanying drawings, in which:

Figure 1 is a schematic diagram of the control circuit of my invention, indicating the arrangement of the single driving motor with respect to the shafts to be positioned; Figs. 2 and 3 are longitudinal and cross-sectional views, respectively, of one form of apparatus to which the control circuit of my invention is adapted for automatic shaft positioning operations; and Fig. 4 shows a group of linear diagrams illustrating the variations in direction and extent of rotation required for transfers from one position to another in the controlled shafts.

The shaft positioning device shown in Figs. 2 and 3, is that described and claimed in the copending application of Arthur A. Collins, supra. The shaft 110 is driven through a friction clutch device comprising the clutch plate 115, rotatable with but longitudinally slidable on the shaft 110, and is continuously urged by a spring in surface contact with a clutch plate driving member 114, constituted as a wheel gear driven by a worm gear 120 on the shaft 11. The driving member 114 is rotatable with respect to the shaft 110, and in such action there is relative movement between the driving member 114 and the clutch plate 115.

The shaft 110 is stopped in desired position by the abutment against a pre-set fixed stop of one of two stop lugs carried on the opposite ends of an arm 118, which is radially shiftable but non-rotatable with respect to the clutch plate 115. The stop lugs are in offset planes and there are two fixed stops in the plane of each stop lug on the arm 118, as indicated in Fig. 3. The stop arm is shiftable radially to project one or the other of the stop lugs for engagement with one of its coacting stops, depending upon the direction of rotation of the arm 118. The means disclosed for shifting the arm 118 comprises a pin 111 fixed in the arm and projecting axially through the clutch plate 115 into a groove 124 in the clutch plate driving member 114. As shown in Fig. 3, the groove 124 is substantially spiral in form for a 360° portion b—d, with but a small radial displacement, however; then for a 180° portion, d, e, there is a substantial radial displacement, sufficient, in coaction with the pin 111, to cause the stop arm 118 to be shifted radially for projecting the opposite stop lug; and then for a 360° portion e—g there is only a small radial displacement as the groove spirals inwardly. Overrun 90° portions are provided at a—b and g—h, but do not enter into the definite operation of the system. It will be understood that the pin 111 remains relatively fixed in the groove 124 when clutch plate 115 and the driving gear member 114 rotate together, and shifting of the stop arm 118 can only be effected when the arm is stopped by abutment of the projected stop lug against one of its coacting stops, the same stop lug being retracted, as the arm shifts radially, until it will clear the particular stop engaged.

Thus, by limiting the degree of rotation of the gear 114 in a given direction or directions, one or the other of the stop lugs on arm 118 will be rotated into the range of adjustment of one of its coacting stops, the shaft 110 being stopped in determined position while the gear 114 completes its prescribed limited rotation. The diagrams shown in Fig. 4 indicate the various prescribed motor operations effective to change the position of the shaft 110 to another position, which operations are automatically controlled by the control circuit of my invention.

In construction, several of the positioning devices are mounted together and driven by a common shaft 11 through separate worm gears 120. Power is furnished to shaft 11 by motor 10, which also drives through suitable gearing, a drum type positioning switch 12 which consists of two commutator segments 12a and 12c separated by small insulating segments 12b and 12d. Bearing on these segments are contacts 12e, f, g, and h, arranged in an arc of less than 180 degrees, commutator segments 12a and 12c being of equal extent. The positions of contacts 12e, f, g and h, and the relative gear ratios between shaft 11, switch 12 and gears 114, are such that when insulating segment 12b is opposite contacts 12e, f, g and h, in succession, gears 114 will be at relative positions of zero, 360, 720, and 1080 degrees, respectively, with pins 111 in the grooves 124 at points b, d, e and g.

It will be noted that although points d and e in the grooves 124 are but 180° displaced, a rotation of 360° of the gears 114 is prescribed. This is required in the apparatus disclosed because in thus effecting the shifting of the arm 118, the newly projected stop lug is 180° further displaced on the circumference of the gear. The additional 180° rotation of the gear is prescribed, therefore, to bring the newly projected stop lug into the same relative position occupied by the formerly projected lug, in order that the operation may proceed definitely. During the additional 180° rotation of the gear 114, or some equivalent rotation during the complete cycle of operation, there is no relative movement of the pins 111 in the grooves 124, so that the pins will at all times be within the positive limits b and g of the grooves. Thus, although the gears 114 may be driven through 1080 degrees of rotation, the pins 11, will at no time have more than 900 degrees of positive relative movement with respect to the gears, and will have the full 900 degrees displacement only when positions one and four are at the extreme opposite ends of the adjustable range of positions for setting the shafts.

As will be seen in Figs. 1 and 4, in order to change from position #1 to position #4, insulating segment 12b is rotated from contact 12e, the position shown, to contact 12h, during which movement gears 114 will move through 1080 degrees in the one direction; and pins 111 may shift through 900 degrees, relative to the gears 114, or may travel with the gears in some instances to such an extent that there is but 540 degrees relative movement, the minimum, in which the pin shifts only from point c to point f, the gear 114 nevertheless completing the full 1080 degrees prescribed. Regardless, therefore, of the setting of the stops and the actual movement of the shafts 110, my invention concerns the control of the motor 10 through prescribed degrees of rotation in one direction or partly in opposite directions, the shafts 110 being automatically set within the limits of the prescribed operation.

Accordingly, to shift from position #1 to position #3, insulating segment 12b is rotated from contact 12e to contact 12h, as in shifting to position #4, but the operation in this instance is continued, motor 10 being reversed and insulating contact 12b is rotated back to contact 12g, whereupon the operation is terminated. And to shift from position #1 to position #2, insulating segment 12b is rotated to contact 12f, whereupon the operation is complete. In the latter instance, the operation corresponds to 360° rotation of gears 114 in one direction. In the former instance, the operation included the 1080° rotation to position #4 and a further rotation of 360° in the reverse direction of gears 114 to reach position #3. Other positions as indicated in Fig. 4 should be apparent from the foregoing.

Referring now to Fig. 1, I employ as a typical manual control the ordinary telephone dial by which selection of positions is obtained by dialing a digit corresponding to the desired position. Minor switch 15 is of the ordinary telephone type and has contacts 15a, b, c and d, which correspond to the four desired positions. The minor switch arm 15e is stepped up to the desired contact by pulses supplied to a rotating magnet 16, and is returned to the home or off-normal position by applicatoin of current to a release magnet 17. Off-normal contacts 15f and g are open with the minor switch arm 15e in the normal position. Telephone dial 14 is supplied with impulse springs 14a and b and off-normal springs 14c, d, and e. A slow release relay 18, having a release time of approximately .05 second, is provided with normally open contacts 18a and b, and two sets of two-way contacts 18c, d, e, and 18f, g, h. A slow release relay 19, having a release time of .250 second, is provided with contacts 19a and b which are normally open, as well as normally closed contacts 19c and d. The differently timed slow release relays 18 and 19 control the sequence of operation in the circuit. Relays 20 and 21 control motor 10 through contacts 20e, f, and 21e, f. When relay 20 is operated, motor 10 revolves so as to drive gears 114 in a clockwise direction and when relay 21 is operated, motor 10 revolves so as to drive gears 114 in a counterclockwise direction. Relays 20 and 21 are each also provided with sets of contacts 20a, b, c and d, and 21a, b, c and d. Electrical power is supplied by battery 22, or any sutiable source of electro-motive force consistent with the electrical design of the system. A magnetic brake 24 is applied to the shaft of motor 10 to secure quick stopping, and is controlled by the motor control relays 20, 21, in accordance with the operation of the motor.

The circuit connections in outline are as follows: The motor 10 which drives shaft 11 has a neutral connection 10n connected directly with the negative side of the battery or source 22. Connection 10f for "forward" operation of the motor connects with the positive side of source 22 through control contacts 20e and f; and connection 10r for "reverse" operation of the motor similarly connects with the positive side of the battery through control contacts 21e and f.

The motor control relay 20 is directly connected with the positive side of the source 22 and to contact segment 12a of drum switch 12, and the circuit may be completed through any of the contacts 12e—h, relay contacts 18c—h, and the minor selector switch 15, in accordance with special conditions; the circuit being continued from switch arm 15e, relay contacts 19a and b, on-normal contacts 14e and d of the dial switch 14 to the negative side of source 22. Motor control relay 21 is directly connected with the positive side of the source 22 and to contact segment 12c of drum switch 12, and the circuit is completed as described for relay 20, the relays 20, 21, being alternately operative in accordance with the position of the contact segments 12a and 12c with respect to the contacts 12e—h on the drum switch, the motor 10 accordingly being driven forward or reverse.

The impulse or rotating magnet 16 of the minor switch 15 is connected at one side directly with the positive side of the source 22, and at the other side with the negative through impulse contacts 14a and b of the dial switch 14. The release magnet 17 for the minor switch 15 is connected at one side directly with the positive side of the source 22, and at the other side through off-normal contacts 15f and g of the minor switch 15 and relay contacts 19c and d to the negative side of the source 22, the latter contacts controlling the application of voltage to the release magnet 17.

Sequence control relay 18, having a brief time lag as noted, is energized directly from the positive side of the source 22, the circuit being completed through the off-normal contacts 14c and d of dial switch 14 to the negative side of the source 22. As the off-normal contacts will be opened as soon as the dial switch returns to normal, a holding circuit is provided for relay 18 comprising contacts 18a and b controlled by the relay itself, and either contacts 20a and b or 21a and b, depending upon which relay 20 or 21 is operated, whereby the circuit is completed to the negative side of the source 22.

Sequence control relay 19, having a longer time lag than relay 18, is energized directly from the positive side of the source 22, the circuit being completed through contacts 18b and a, and off-normal contacts 14c and d, to the negative side of source 22, thus operating relay 19 immediately pursuant to the functioning of relay 18. A portion of the holding circuit for relay 18 is connected with relay 19; that is, the circuit may be completed through relay contacts 20a and b or 21a and b, whichever may be closed. The slow release feature of relays 18 and 19 together with the holding circuits therefor, assure positive operation of the system, and prevent premature release of the contacts controlled by these relays.

The magnetic brake shown schematically at 24 is connected through separate motor control relay contacts 20c and d and 21c and d, in series between the negative of the source 22 and the magnetic brake 24, the circuit being completed by direct connection to the positive side of the source 22. Thus if either of the relays 20 or 21 is actuated for driving the motor 10, the magnetic brake 24 is disconnected.

The sequence of operation may be described as follows: Supposing operation has been had to a position #1, and it is desired to change to a position #3; segment 12b is at rest against contact 12e. The digit 3 is dialed on dial switch 14, which action first breaks the circuit through contacts 14d, e, and completes the circuit from battery 22 through contacts 14d, c, and relay coil 18, operating relay 18. Contacts 18a and b immediately close operating relay 19. Upon release of the dial, contacts 14a and b close and open three times, completing the circuit through rotating magnet 16 three times and causing minor switch arm 15e to step up to contact 15c. Upon return of the dial to normal, contact is broken between 14d and c, but relays 18 and 19 do not release instantaneously due to their slow release action. Contacts 14d and e close completing the circuit from battery 22 through contacts 14d and e, contacts 19b and a, (now closed), minor switch arm 15e and contact 15c, contacts 18d and e, (now closed), contact 12h, contact segment 12c, and relay coil 21. Motor 10 is driven in a clockwise direction until insulating segment 12b comes opposite contact 12h, corresponding to 1080 degrees rotation of gears 114. During the time that relay 21 was operated, a circuit was completed through battery 22, contacts 21b and a and relay 19, and another through contacts 21b and a, contacts 18b and a, and relay 18, holding them operated. Upon release of relay 21, motor 10 stops and contacts 21a and b open.

After a time of .05 second relay 18 opens, transferring connection from contact 15c through contact 18d to contact 18c and contact 12g on the drum switch 12. A circuit is now complete from battery 22 through contacts 14d and e, 19b and a, switch arm 15e and contacts 15c, 18d and c, contact segment 12a and relay 20. Relay 20 operates immediately completing a circuit from battery 22 through contacts 20b and a and relay 19, again holding it operated; relay 19 has not dropped out as its release time is considerably longer than that of relay 18. Operation of relay 20 causes motor 10 to rotate in a counter-clockwise direction until insulating segment 12b has come opposite contact 12g at which point the circuit to relay 20 is broken. Release of relay 20 will open contacts 20a and b and the circuit through relay 19.

After sufficient delay, relay 19 will drop out opening contacts 19a and b and closing contacts 19c and d. A circuit is now completed from battery 22 through contacts 19d and c, contacts 15g and f, and release magnet 17, which causes minor switch arm 15e to return to the home position. In the home position contacts 15g and f open and remove power from release magnet 17 so that the circuit is now ready for another cycle of operation.

As previously described, the angular positions of shafts 110 are changed from those corresponding to position #1 to those corresponding to position #3 if switch 12 is rotated so that segment 12b runs from contact 12e to contact 12h and then returns to contact 12g. Such operation is automatically accomplished by the electrical sequence above described.

Upon further inspection it will be seen that if the number "1" or "2" is dialed, motor 10 will run all shafts to position #1 regardless of what the previous position had been; or will run all shafts to position #4, if number "3" or "4" is dialed. The motor then stops and if the number dialed was "2" or "3", the motor will reverse and run the shafts to that position. Also, if the previously set position is #1 or #4 and the same number were dialed again, the positions would remain fixed, while if the previous position is #2, and "2" were again dialed, the motor would run to position #1, and then back to #2, the same holding for position #3 with respect to #4. This is not objectionable, and is proof that the system is not affected by mis-dialing for a position already had.

Since positioning is effected against a stop, with force applied through a friction clutch, it is not desired to have any hunting action due to alternate contacts between one of the contacts 12e—h and both contact segments 12a and c at any point in the cycle. The insulating segments 12b and d may be enlarged in circumferential length, contacts 12e—h being relatively positioned accordingly, in lieu of magnetic brake 24 shown in connection with the shaft of motor 10. This brake is only applied when relays 20 and 21 are not operated, and draws but small current from the source 22.

The difference in release time of relays 18 and 19 is important, as at certain stages of the operation both of these stages are deenergized and the continuance of the proper sequence is dependent upon their proper operation. For example, both relays must hold in when off-normal contacts 14d and c open until contacts 14d and e close, sending current through control switch 12 and relay 20 or 21, and relay 20 or 21 operates to establish the holding circuit for the relays 18, 19. Again, after the control switch 12 has rotated to deenergize the relay 20 or 21, the relays 18 and 19 are deenergized; now relay 19 must hold longer than relay 18 in order that relay 20 or 21 may be operated if "2" or "3" has been the number dialed, current being led through contacts 18f and g, or 18c and d, to control switch 12, to the relay concerned. It will be noted further in this instance, that relay 18 is not again energized, the holding circuit therefor being broken at contacts 18a, b. Subsequent deenergization of the motor control relay 20 or 21 is final and relay 19 releases in due course, operating to disconnect the minor switch arm from the source, so that the motor control relays will not be operated as the minor switch returns to normal, upon the immediate operation of the release magnet 17.

While I have described my invention in a certain preferred embodiment, I desire it to be understood that modifications may be made therein, and that I intend no limitations upon my invention except as are imposed by the scope of the appended claims.

What I claim as new and desire to secure by Letters Patent of the United States is as follows:

1. In combination, a reversible motor, motor directional control relays connected therewith, means actuated by the motor for controlling the energization of said relays, separate means including a selector switch and sequence control relay devices connected with the aforesaid means and operative in a predetermined series of operations for controlling the operation of the aforesaid motor control relays, and means controlled by said motor control relays for disconnecting said separate means when both said relays are deenergized.

2. The combination set forth in claim 1 including a magnetic brake device mechanically connected with said motor, and means controlled by said motor control relays for controlling the operation of said brake.

3. The combination set forth in claim 1 including a dial impulse switch device and means cooperative therewith for controlling the said selector switch.

4. A control circuit for a motor actuated shaft positioning system, comprising a dial impulse switch and a coacting minor switch, a drum type control switch driven by the motor, sequence control relay switch means connected between said minor switch and said control switch, a source of power, motor control relay means connected with said source of power through said control switch and said minor switch, a slow release sequence control relay connected with said source of power and controlled by said motor control relay means, switch means controlled by the last said relay and adapted to control the release of said minor switch.

5. A control circuit for a motor actuated shaft positioning system as set forth in claim 4 and including off-normal contacts on said dial impulse switch connected in circuit with the source of power and said sequence control relay switch means whereby said relay switch means is energized upon the operation of said dial switch, and a holding circuit for said relay switch means including contacts controlled by said motor control relay means.

6. A control circuit for a motor actuated shaft positioning system as set forth in claim 4 and including off-normal contacts on said dial impulse switch connected in circuit with the source of power and said sequence control relay switch means, a holding circuit for said relay switch means including self-actuated contacts and contacts controlled by said motor control relay means, the slow release sequence control relay being energized through the self-actuated contacts of said relay switch means and having a holding circuit comprising said contacts controlled by said motor control relay means, whereby said sequence control relay switch means remains deenergized when said self-actuated holding contacts are opened, while said slow release sequence control relay remains actuated and may be reenergized under control of said motor control relay means.

7. A control circuit for a motor actuated shaft positioning system, comprising a dial impulse switch and a coacting minor switch, a control switch driven by the motor, a source of power, sequence control relay switch means connected between said minor switch and said control switch, motor control relay means energized from said source through said control switch and said minor switch, a slow release sequence control relay device having contacts connected in circuit with said minor switch and additional contacts adapted to control the release of said minor switch, said slow release relay device being adapted to release said contacts with the shaft in set position for disconnecting the source of power from said minor switch and said motor control relay means, whereby the release of said minor switch is effected while maintaining the shaft in set position.

8. A control circuit for a motor actuated shaft positioning system, comprising selector means for establishing an initial control circuit including a source of power, a control switch and motor control relays, the motor being operated in one direction in accordance with the operation of the motor control relays in said initial control circuit; a slow release relay adapted to control the operation of said selector means, and a slow release relay having a longer time delay constant and relay contacts controlled thereby connected with said selector means; switch means controlled by said motor control relays for holding both said slow release relays energized during operation of the motor; the first said slow release relay being adapted to release a predetermined time after deenergization and to establish a final control circuit including said source of power, said control switch and said motor control relays, the motor being operated in the opposite direction in accordance with the operation of the motor control relays in said final control circuit; the said slow release relay of longer time delay constant having remained actuated during the operation of said final control circuit, being reenergized through said switch means, and adapted to release a predetermined time after deenergization from said final control circuit for disconnecting said selector means.

ROBERT E. SAMUELSON.